United States Patent
Hou et al.

(10) Patent No.: US 11,434,863 B2
(45) Date of Patent: Sep. 6, 2022

(54) WAVE RECEIVING PLATE AND WAVE POWER GENERATION SYSTEM

(71) Applicants: THE YOKOHAMA RUBBER CO., LTD., Tokyo (JP); THE UNIVERSITY OF TOKYO, Tokyo (JP)

(72) Inventors: Gang Hou, Hiratsuka (JP); Shigehiko Amano, Hiratsuka (JP); Masato Tadokoro, Hiratsuka (JP); Koji Motoyama, Hiratsuka (JP); Koki Maruyama, Tokyo (JP); Chang-Kyu Rheem, Tokyo (JP); Hidetaka Kobayashi, Tokyo (JP)

(73) Assignees: The Yokohama Rubber Co., Ltd., Tokyo (JP); The University of Tokyo, Tokyo (JP)

( * ) Notice: Subject to any disclaimer, the term of this patent is extended or adjusted under 35 U.S.C. 154(b) by 185 days.

(21) Appl. No.: 16/963,756

(22) PCT Filed: Jul. 19, 2018

(86) PCT No.: PCT/JP2018/027186
§ 371 (c)(1),
(2) Date: Jul. 21, 2020

(87) PCT Pub. No.: WO2019/146141
PCT Pub. Date: Aug. 1, 2019

(65) Prior Publication Data
US 2021/0095634 A1   Apr. 1, 2021

(30) Foreign Application Priority Data
Jan. 25, 2018 (JP) .............................. JP2018-010747

(51) Int. Cl.
*F03B 13/10*   (2006.01)
*F03B 13/12*   (2006.01)
(Continued)

(52) U.S. Cl.
CPC .......... *F03B 13/188* (2013.01); *F03B 13/182* (2013.01); *F05B 2280/401* (2013.01);
(Continued)

(58) Field of Classification Search
CPC .................. F03B 13/182; F03B 13/188; F05B 2280/4003; F05B 2280/4004; F05B 2280/401; F05B 2280/6015
See application file for complete search history.

(56) References Cited

U.S. PATENT DOCUMENTS 3,151,564 A * 10/1964 Rosenberg ............ F03B 13/182
60/499
4,170,738 A * 10/1979 Smith .................... F03B 13/185
416/64

(Continued)

FOREIGN PATENT DOCUMENTS

JP   S58-178879 A   10/1983
JP   S59-9171 U    1/1984
(Continued)

OTHER PUBLICATIONS

Extended European search report dated Jul. 21, 2021 issued over the corresponding EP Patent Application No. 18 90 2924.2.

*Primary Examiner* — Tulsidas C Patel
*Assistant Examiner* — Thomas K Quigley
(74) *Attorney, Agent, or Firm* — Carrier Blackman & Associates, P.C.; William D. Blackman; Joseph P. Carrier

(57) ABSTRACT

A wave receiving plate is pivotably supported by a support device in the wave force generation system and includes a flexible plate in at least a part of the wave receiving plate.

17 Claims, 8 Drawing Sheets

(51) Int. Cl.
*H02P 9/04* (2006.01)
*F03B 13/18* (2006.01)

(52) U.S. Cl.
CPC .............. *F05B 2280/4003* (2013.01); *F05B 2280/4004* (2013.01); *F05B 2280/6015* (2013.01)

(56) References Cited

U.S. PATENT DOCUMENTS

| | | | | |
|---|---|---|---|---|
| 4,210,821 | A * | 7/1980 | Cockerell | F03B 13/20 290/54 |
| 4,258,270 | A * | 3/1981 | Tornkvist | F03B 13/1815 60/499 |
| 4,400,940 | A * | 8/1983 | Watabe | F03B 13/182 417/330 |
| 4,490,621 | A * | 12/1984 | Watabe | F03B 13/182 60/497 |
| 4,580,400 | A * | 4/1986 | Watabe | F03B 13/182 417/330 |
| 4,931,662 | A * | 6/1990 | Burton | F03B 13/1815 60/507 |
| 7,131,269 | B2 * | 11/2006 | Koivusaari | F03B 13/182 60/495 |
| 7,759,813 | B2 * | 7/2010 | Fujisato | F03B 13/1815 60/398 |
| 7,964,984 | B2 * | 6/2011 | Saavedra | F03D 5/06 290/55 |
| 8,110,937 | B2 * | 2/2012 | Finnigan | F03B 13/182 290/53 |
| 8,686,582 | B2 * | 4/2014 | Gardiner | F03B 13/20 290/53 |
| 8,742,614 | B2 * | 6/2014 | Saavedra | F03D 9/25 290/55 |
| 8,884,457 | B1 * | 11/2014 | Jones | H02P 9/04 290/43 |
| 8,890,344 | B2 * | 11/2014 | Hoffmann | F03B 17/065 416/1 |
| 9,739,257 | B2 * | 8/2017 | Bateman | F03B 17/06 |
| 9,752,551 | B2 * | 9/2017 | Järvinen | F03B 17/06 |
| 11,008,999 | B2 * | 5/2021 | Maruyama | F03B 15/00 |
| 2004/0007881 | A1 * | 1/2004 | Kobashikawa | B01D 61/10 290/53 |
| 2006/0150626 | A1 * | 7/2006 | Koivusaari | F03B 13/182 60/498 |
| 2008/0018113 | A1 * | 1/2008 | Tal-or | F03B 13/182 290/53 |
| 2008/0191485 | A1 * | 8/2008 | Whittaker | F03B 13/182 290/53 |
| 2009/0217657 | A1 * | 9/2009 | Budd | F03B 13/1815 60/495 |
| 2010/0111609 | A1 * | 5/2010 | Espedal | F03B 13/182 405/76 |
| 2010/0156106 | A1 * | 6/2010 | Finnigan | F03B 13/182 290/53 |
| 2013/0147193 | A1 * | 6/2013 | Hoffmann | F03B 13/20 290/42 |
| 2014/0196451 | A1 * | 7/2014 | Bateman | F03B 13/182 60/499 |
| 2015/0167629 | A1 * | 6/2015 | Wigant | F03B 13/182 60/499 |
| 2020/0400115 | A1 * | 12/2020 | Maruyama | F03B 13/182 |
| 2021/0040931 | A1 * | 2/2021 | Maruyama | F03B 13/182 |
| 2021/0095634 | A1 * | 4/2021 | Hou | F03B 13/182 |
| 2021/0270228 | A1 * | 9/2021 | Maruyama | F03B 13/22 |

FOREIGN PATENT DOCUMENTS

| | | |
|---|---|---|
| JP | S59-13679 U | 1/1984 |
| JP | S59-47372 U | 3/1984 |

\* cited by examiner

WAVE RECEIVING PLATE AND WAVE POWER GENERATION SYSTEM

TECHNICAL FIELD

The present technology relates to a wave receiving plate and a wave power generator system.

BACKGROUND ART

Wave power generation is known as one of the power generation methods that utilize natural energy. Wave power generation refers to a power generation method that generates power using wave energy. Japan Unexamined Patent Publication No. S58-178879 describes a technique related to pendulum type power generation. Pendulum type wave power generation includes a wave receiving plate that swings by wave energy. A wave power generation system generates power by converting kinetic energy of a wave receiving plate that swings by wave energy into mechanical energy, and converting mechanical energy to electrical energy.

The wave height changes to various values depending on natural conditions. For example, a wave having a wave height of 1 m may be generated, or a wave having a wave height of 10 m or more may be generated. Wave energy is proportional to the square of the wave height. Accordingly, there is a possibility that wave energy may change 100 times or more due to natural conditions. In a case where a wave height higher than an estimated value is generated and wave energy higher than an estimated value acts on a wave receiving plate, there is a possibility that the wave receiving plate or the power generation device may be damaged or broken. On the other hand, when the estimated value of the wave height is set to a high value, there is a possibility that the power generation efficiency may be reduced or that the power generation device may become larger.

There is an idea to suppress excessive wave energy from acting on the wave receiving plate by changing the area of the wave receiving plate with a mechanical device based on the change of the wave energy. However, since the wave receiving plate is disposed in the ocean, there is a possibility that in the method of changing the area of the wave receiving plate with a mechanical device, the performance of the wave receiving plate may deteriorate due to salt damage.

SUMMARY

The present technology provides a wave receiving plate and a wave power generation system capable of suppressing a decrease in performance at low cost.

In accordance with one aspect of the technology, a wave receiving plate is provided that is pivotably supported by a support device in a wave power generation system and includes a flexible plate in at least a part of the wave receiving plate.

According to one aspect of the present technology, at least a part of the wave receiving plate is the flexible plate, and thus when excessive wave energy acts on the wave receiving plate, the flexible plate deflects. Deflection of the flexible plate reduces the area (projected area) of the wave receiving plate with respect to the wave front, and thus it is possible to suppress excessive wave energy from acting on the wave receiving plate. Accordingly, failure or breakage of the wave receiving plate or the power generation device is suppressed. No mechanical device is used and the area of the wave receiving plate may be passively changed, and thus the durability of the wave receiving plate may be improved at low cost, and a decrease in the performance of the wave receiving plate may be suppressed.

In one aspect of the present technology, a lower end portion of the flexible plate is preferably a free end.

As a result, even in a case where the lower end portion of the wave receiving plate comes into contact with the ocean floor due to a change in topography of the ocean floor caused by a flood or a typhoon, excessive stress is suppressed from acting on the wave receiving plate by deflection of the flexible plate. Accordingly, failure or breakage of the wave receiving plate or the power generation device is suppressed.

In one aspect of the present technology, the flexible plate preferably includes a first flexible plate and a second flexible plate adjacent to the first flexible plate.

Accordingly, in a case where wave energy acts on the wave receiving plate, the wave receiving plate may deflect in a prescribed direction by a prescribed deflection amount by a combination of the first flexible plate and the second flexible plate. For example, due to the combination of the first flexible plate and the second flexible plate, when a first wave energy acts on the wave receiving plate from a first direction, the wave receiving plate may deflect in a second direction opposite the first direction by a first deflection amount, and when a second wave energy acts on the wave receiving plate from a second direction, the wave receiving plate may deflect in the first direction by a second deflection amount.

In one aspect of the present technology, the lower end portion of the second flexible plate is preferably disposed above a lower end portion of the first flexible plate.

Accordingly, the flexible plate becomes an asymmetrical structure, and when a first wave energy acts from a first direction and when a second wave energy acts from a second direction, the flexible plate may deflect respectively in the second direction and the first direction at asymmetrical amounts of deflection.

In one aspect of the present technology, the rigidity of the second flexible plate is preferably greater than the rigidity of the first flexible plate.

Accordingly, the first flexible plate having a large dimension in the vertical direction and a low rigidity may be greatly deflected by the action of the wave energy. The second flexible plate having a small dimension in the vertical direction and a high rigidity may support the first flexible plate.

In one aspect of the present technology, the second flexible plate is preferably disposed further on an incident wave side than the first flexible plate.

Accordingly, when an incident wave having a high wave energy from the offshore side acts on the wave receiving plate, the first flexible plate may deflect greatly toward the shore side. Thus, excessive wave energy is suppressed from acting on the wave receiving plate. In a case where a reflection wave having a small wave energy from the shore side acts on the wave receiving plate, the first flexible plate is supported by the second flexible plate, and thus the first flexible plate is suppressed from deflecting toward the offshore side. By suppressing deflection of the flexible plate, the wave receiving plate may behave as a rigid plate. Accordingly even when the wave energy acting on the wave receiving plate is small, the wave receiving plate may sufficiently swing. In this way, when an incident wave having a high wave energy acts on the wave receiving plate, the flexible plate greatly deflects, and thus excessive wave energy is suppressed from acting on the wave receiving plate. When a reflection wave having a small wave energy acts on the wave receiving plate, deflection of the flexible plate is suppressed, and thus the wave receiving plate may sufficiently swing.

In one aspect of the present technology, a rigid plate connected to the support device is preferably provided, and the flexible plate is preferably supported by a lower end portion of the rigid plate.

Accordingly, when excessive wave energy acts on the wave receiving plate, the flexible plate supported by the rigid plate deflects, and the area of the wave receiving plate with respect to the wave front is reduced. Accordingly, excessive wave energy may effectively be suppressed from acting on the wave receiving plate or power generation device. Moreover, even when wave energy acting on the wave receiving plate is small, the wave receiving plate may sufficiently swing due to the wave energy acting on the rigid plate. The rigid plate refers to a plate that is more rigid than the flexible plate and does not substantially deflect even when wave energy acts. Examples of the rigid plate include a metal plate such as an iron plate or an aluminum plate.

In one aspect of the present technology, the flexible plate preferably includes a rubber plate.

Accordingly, the durability of the wave receiving plate may be improved. The rubber plate has high corrosion resistance to salt. Accordingly, even when the wave receiving plate is submerged in the ocean, the wave receiving plate is suppressed from deteriorating in a short period. In addition, the specific gravity of rubber is approximately 1.0, and thus the weight of the wave receiving plate may be reduced due to the flexible plate including the rubber plate. Moreover, the manufacturing cost and the maintenance administrative cost of the wave receiving plate may be reduced, and thus the cost of the wave receiving plate may be reduced. Furthermore, the properties (structure, dimensions, material, elastic modulus, strength, weight, thickness, and layer number) of the rubber may be adjusted to improve the performance of the wave receiving plate.

In one aspect of the present technology, the flexible plate preferably includes a viscoelastic plate.

Accordingly, similar to the rubber plate, the durability of the wave receiving plate may be improved, and weight reduction may be achieved.

In one aspect of the present technology, the flexible plate is preferably a composite material of a rubber plate and a reinforcing member.

Accordingly, the performance of the wave receiving plate may be improved by adjusting the properties (at least one of structure, dimensions, material, elastic modulus, strength, weight, thickness, or layer number) of the reinforcing member.

In one aspect of the present technology, the flexible plate is preferably a composite material of a viscoelastic plate and a reinforcing member.

Accordingly, the performance of the wave receiving plate may be improved as in the case of the composite material of the rubber plate and the reinforcing material.

In one aspect of the present technology, the reinforcing member may include at least one of synthetic fiber, semi-synthetic fiber, regenerated fiber, plant fiber, carbon fiber, animal fiber, metal fiber, metal wire, or metal plate.

Accordingly, the durability of the wave receiving plate may be improved, and weight reduction may be achieved.

Note that, examples of the viscoelastic plate include at least one of a urethane plate, a resin plate, a silicone plate, or a plastic plate. Examples of synthetic fibers include at least one of nylon, polyester, acrylic, polyvinyl chloride, polyurethane, vinylon, or aramid. Examples of semi-synthetic fibers include at least one of acetate, triacetate, or promix. Examples of regenerated fibers include at least one of rayon, cupro, or polynosic. Examples of plant fibers include at least one of cotton or hemp. Examples of carbon fibers include at least one of acrylic or pitch. Examples of animal fibers include at least one of hair, angora, spider silk, or mohair. Examples of the metal fibers include at least one of silver thread or steel thread.

According to one aspect of the present technology, a wave power generation system is provided that includes a wave receiving plate, a support device pivotably supporting the wave receiving plate, and a power generation device that generates power based on kinetic energy of the wave receiving plate swinging by wave energy.

According to one aspect of the present technology, a decrease in performance may be suppressed at low cost.

According to the aspects of the present technology, a wave receiving plate and a wave power generation system are provided that are capable of suppressing a reduction in performance at low cost.

DETAILED DESCRIPTION

Hereinafter, embodiments of the present technology will be described with reference to the drawings, however the present technology is not limited thereto. The constituents of the embodiments described below may be appropriately combined. In addition, some of the constituents may not be used in some embodiments.

In the following description, the positional relationship of each part will be described using the terms "up", "down", "front", "back", "left", and "right". These terms indicate a relative position or direction with respect to the wave receiving plate.

Wave Power Generation System

Figure 1:
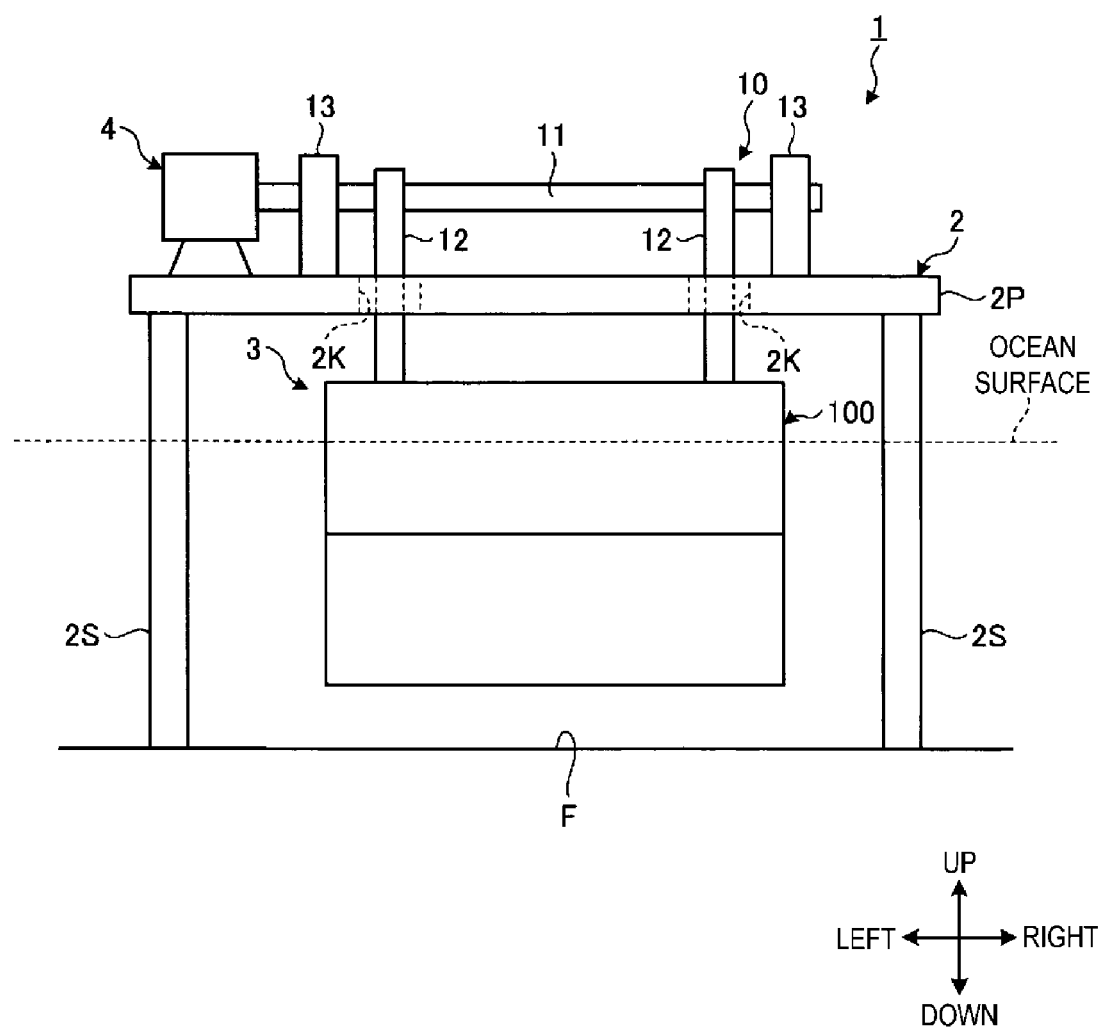
FIG. 1 is a front view illustrating an example of the wave power generation system according to the present embodiment.

FIG. 1 is a front view illustrating an example of a wave power generation system 1 according to the present embodiment. The wave power generation system 1 is installed near a shore and generates power by converting wave energy into electric energy. The wave power generation system 1 is installed near a wave-dissipating block provided on the shore. The wave power generation system 1 includes a building 2, a wave receiving device 3, and a power generation device 4.

The building 2 is supported on the ocean floor F near the wave-dissipating block. The building 2 includes a plurality of pillars 2S fixed to the ocean floor F, and a floor plate 2P supported by the plurality of pillars 2S. The floor plate 2P is disposed above the ocean surface.

The wave power generation system 1 is of a pendulum type (movable object type). The wave receiving device 3 includes a wave receiving plate 100 and a support device 10 that pivotably supports the wave receiving plate 100. The wave receiving plate 100 may, alternatively, be referred to as a wave receiving plate assembly 100, since it includes several component parts. The support device 10 is supported by the floor plate 2P. At least a part of the wave receiving plate 100 is disposed in the ocean. In the wave power generation system 1, the wave receiving plate 100 is pivotably supported by the support device 10. The wave receiving plate 100 swings by wave energy.

The support device 10 includes a shaft member 11, an arm member 12, and a bearing device 13. The bearing device 13 is supported by the floor plate 2P. The shaft member 11 is rotatably supported by the bearing device 13. The arm member 12 is fixed to the shaft member 11. The arm member 12 projects downward from the shaft member 11. An opening 2K in which the arm member 12 is disposed is formed in the floor plate 2P. The upper end portion of the arm member 12 is fixed to the shaft member 11, and the lower end portion of the arm member 12 is disposed below the floor plate 2P. The lower end portion of the arm member 12 is positioned above the ocean surface. The wave receiving plate 100 is fixed to the lower end portion of the arm member 12. The shaft member 11 and the wave receiving plate 100 are connected by interposing the arm member 12. As the wave receiving plate 100 swings, the shaft member 11 that is fixed to the wave receiving plate 100 by interposing the arm member 12 rotates.

The power generation device 4 generates power based on the kinetic energy of the wave receiving plate 100 that swings by wave energy. The power generation device 4 is supported by the floor plate 2P. The power generation device 4 is connected to the shaft member 11. When the wave receiving plate 100 swings and the shaft member 11 fixed to the wave receiving plate 100 by interposing the arm member 12 rotates, the power generation device 4 generates power.

Wave Receiving Plate

Figure 2:
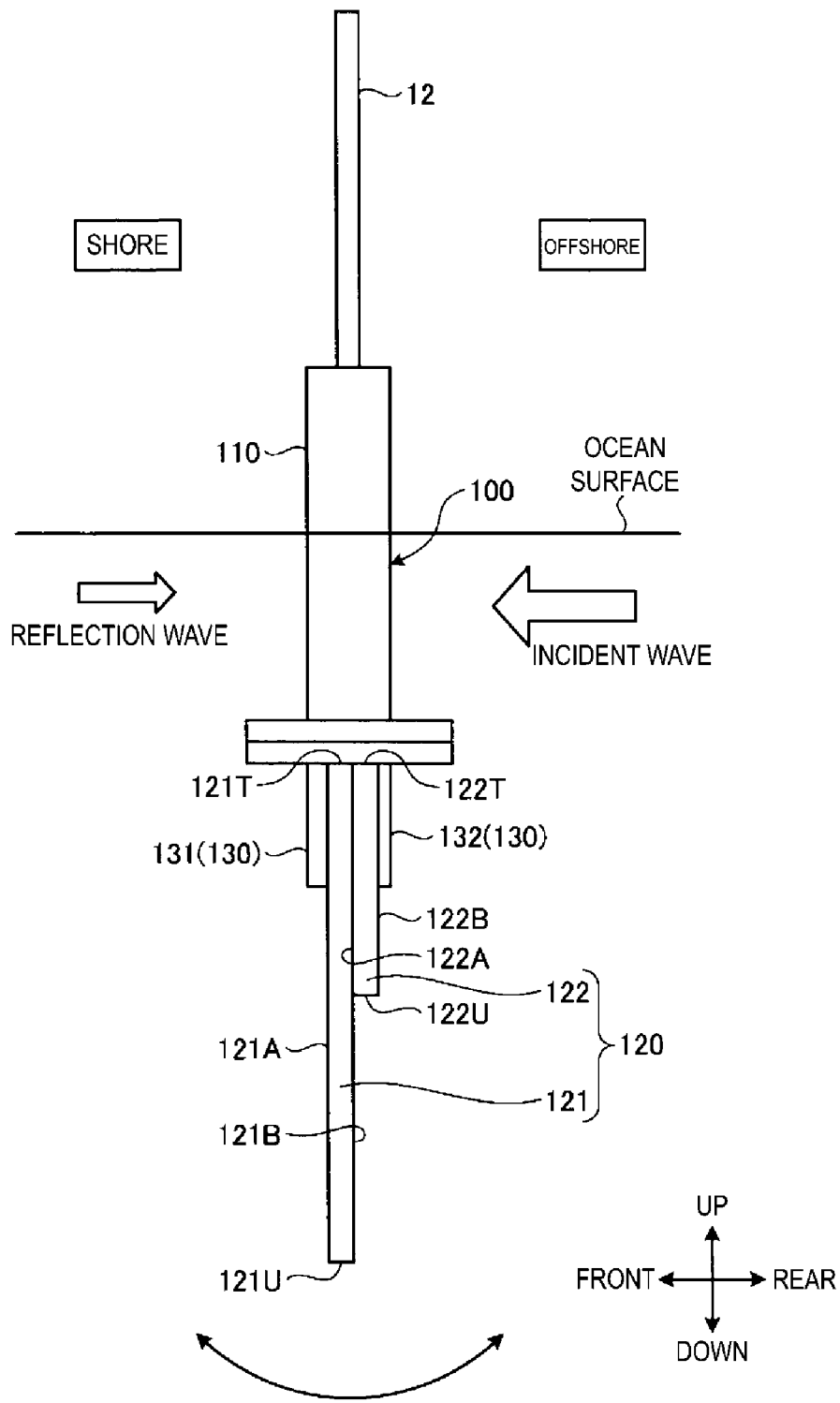
FIG. 2 is a side view illustrating an example of the wave receiving plate according to the present embodiment.

FIG. 2 is a side view illustrating an example of the wave receiving plate 100 according to the present embodiment. As illustrated in FIGS. 1 and 2, the wave receiving plate 100 is pivotably supported by the support device 10 in the wave power generation system 1. The wave receiving plate 100 includes a flexible plate 120 in at least a part.

The wave receiving plate 100 includes a rigid plate 110 connected to the support device 10. The rigid plate 110 is fixed to the lower end portion of the arm member 12. The flexible plate 120 is supported on a lower portion of the rigid plate 110. The rigid plate 110 and the flexible plate 120 are formed from different materials. The rigidity of the rigid plate 110 is greater than the rigidity of the flexible plate 120.

The flexible plate 120 refers to a plate that may deflect by the action of wave energy. The flexible plate 120 includes an elastic member. In the present embodiment, the flexible plate 120 includes a rubber plate. Note that the flexible plate 120 may also include a viscoelastic plate. Examples of the viscoelastic plate include at least one of a urethane plate, a resin plate, a silicone plate, or a plastic plate.

The rigid plate 110 refers to a plate that does not substantially bend even when wave energy acts. In the present embodiment, the rigid plate 110 includes a metal plate. Examples of a metal plate include an iron plate or an aluminum plate.

The rigid plate 110 is fixed to the lower end portion of the arm member 12. An upper portion of the rigid plate 110 is disposed above the ocean surface. A lower portion of the rigid plate 110 is disposed in the ocean.

The flexible plate 120 is fixed to the lower end portion of the rigid plate 110. The flexible plate 120 is disposed in the ocean.

The outer shape of the wave receiving plate 100 is substantially rectangular. An incident wave, which is a wave from the offshore side, and a reflection wave, which is a wave from the shore side that has been reflected by the shore C (wave-dissipating block B) both act on the wave receiving plate 100. The wave receiving plate 100 is disposed in the ocean such that the surface of the wave receiving plate 100 and the wave front of the incident wave are parallel. In the following description, the surface of the wave receiving plate 100 facing the shore side is appropriately referred to as the front surface of the wave receiving plate 100, and the surface of the wave receiving plate 100 facing the offshore side is appropriately referred to as the rear surface of the wave receiving plate 100.

The wave receiving plate 100 receives the wave energy of the incident wave on the rear surface and receives the wave energy of the reflection wave on the front surface. By receiving the wave energy, the wave receiving plate 100 swings about the center axis of the shaft member 11.

The lower end portion of the flexible plate 120 is a free end. A free end refers to an end portion that is not fixed by a member. The upper end portion of the flexible plate 120 is a fixed end that is fixed to the rigid plate 110.

Flexible plate 120 includes a first flexible plate 121 and a second flexible plate 122 that is adjacent to the first flexible plate 121.

The upper end portion 121T of the first flexible plate 121 and the upper end portion 122T of the second flexible plate 122 are fixed to the lower end portion of the rigid plate 110 by a fixing member 130. The fixing member 130 includes a first fixing member 131 that supports the first flexible plate 121, and a second fixing member 132 that supports the second flexible plate 122. Each of the first and second fixing members 131 and 132 is a plate member. The upper end portion of the first fixing member 131 is fixed to the lower end portion of the rigid plate 110. The first securing member 131 supports an upper portion of the front surface 121A of the first flexible plate 121. The lower end portion of the first fixing member 131 is disposed above the lower end portion 121U of the first flexible plate 121 and the lower end portion 122U of the second flexible plate 122. The upper end portion of the second fixing member 132 is fixed to the lower end portion of the rigid plate 110. The second fixing member 132 supports an upper portion of the rear surface 122B of the second flexible plate 122. The lower end portion of the second fixing member 132 is disposed above the lower end portion 121U of the first flexible plate 121 and the lower end portion 122U of the second flexible plate 122.

In the vertical direction, the dimension of the first flexible plate 121 is larger than the dimension of the second flexible plate 122. The upper end portion 121T of the first flexible plate 121 and the upper end portion 122T of the second flexible plate 122 are disposed at substantially the same height. The lower end portion 122U of the second flexible plate 122 is disposed above the lower end portion 121U of the first flexible plate 121.

In the horizontal direction, the dimension of the first flexible plate 121 and the dimension of the second flexible plate 122 are substantially equal. The left end portion of the first flexible plate 121 and the left end portion of the second flexible plate 122 are disposed at the same position. The right end portion of the first flexible plate 121 and the right end portion of the second flexible plate 122 are disposed at the same position.

Each of the lower end portion 121U, the left end portion, and the right end portion of the first flexible plate 121 is a free end. Each of the lower end portion 122U, the left end portion, and the right end portion of the second flexible plate 122 is a free end. The upper end portion 121T of the first flexible plate 121 is a fixed end. The upper end portion 122T of the second flexible plate 122 is a fixed end.

The rigidity of the second flexible plate 122 is greater than the rigidity of the first flexible plate 121. As illustrated in FIG. 2, the second flexible plate 122 is disposed further on the incident wave side than the first flexible plate 121. The first flexible plate 121 is disposed further on the reflective wave side than the second flexible plate 122.

Flexible Plate

Figure 3:
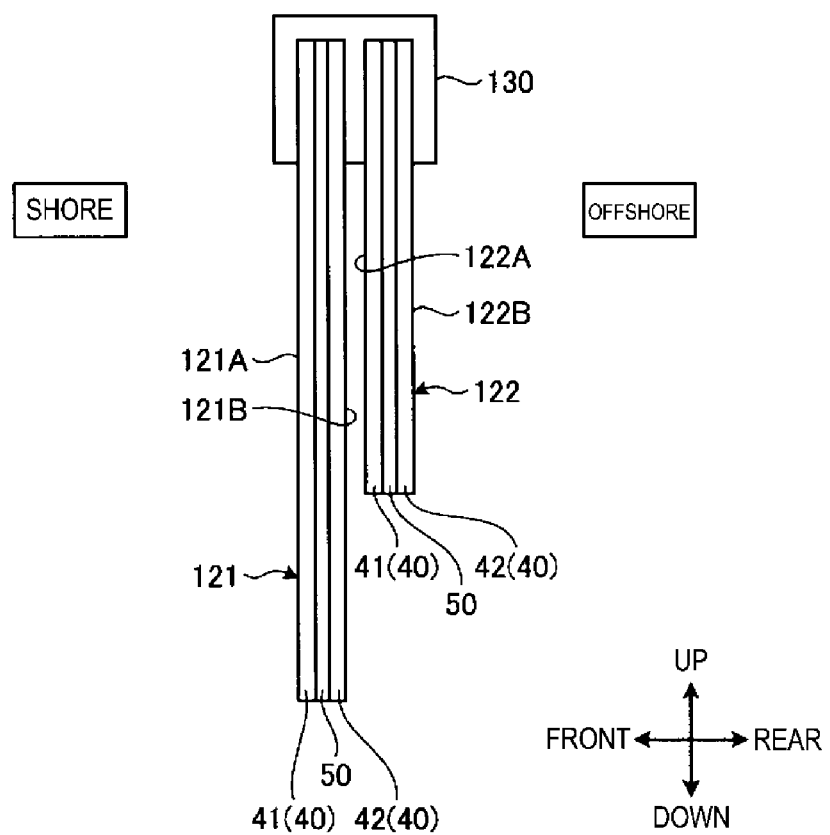
FIG. 3 is a side cross-sectional view schematically illustrating a flexible plate according to the present embodiment.

FIG. 3 is a cross-sectional side view schematically illustrating the flexible plate 120 according to the present embodiment. As illustrated in FIG. 3, the first flexible plate 121 includes a front surface 121A that faces the shore side (reflection wave side) and a rear surface 121B that faces the offshore side (incident wave side). The second flexible plate 122 includes a front surface 122A that faces the shore side (reflection wave side) and a rear surface 122B that faces the offshore side (incident wave side). At least a part of the rear surface 121B of the first flexible plate 121 faces the front surface 122A of the second flexible plate 122. The first flexible plate 121 and the second flexible plate 122 are not connected, and they may deflect separately.

In the present embodiment, the first flexible plate 121 is a composite material of a rubber plate 40 and a reinforcing member 50. The rubber plate 40 includes a front surface rubber plate 41 and a rear surface rubber plate 42. The reinforcing member 50 is disposed between the front surface rubber plate 41 and the rear surface rubber plate 42. The front surface 121A of the first flexible plate 121 is disposed on the front surface rubber plate 41. The rear surface 121B of the first flexible plate 121 is disposed on the rear surface rubber plate 42.

The reinforcing member 50 includes at least one of synthetic fiber, semi-synthetic fiber, regenerated fiber, plant fiber, carbon fiber, animal fiber, metal fiber, metal wire, or a metal plate. Examples of synthetic fibers include at least one of nylon, polyester, acrylic, polyvinyl chloride, polyurethane, vinylon, or aramid. Examples of semi-synthetic fibers include at least one of acetate, triacetate, or promix. Examples of recycled fibers include at least one of rayon, cupro, or polynosic. Examples of plant fibers include at least one of cotton or hemp. Examples of carbon fibers include at least one of acrylic or pitch. Examples of animal fibers include at least one of hair, angora, spider silk, or mohair. Examples of the metal fibers include at least one of silver thread or steel thread.

Note that the reinforcing member 50 may be canvas. Examples of canvas include at least one of nylon canvas, polyester canvas, aramid canvas, or cotton canvas.

By adjusting the properties of at least one of the front surface rubber plate 41, the rear surface rubber plate 42, or the reinforcing member 50, the rigidity of the first flexible plate 121 is adjusted. Note that the properties of the rubber plate 40 refer to at least one of the structure, dimensions, material, elastic modulus, strength, weight, thickness, or layer number of the rubber plate 40. The properties of the reinforcing member 50 refer to at least one of the structure, dimensions, material, elastic modulus, strength, weight, thickness, or layer number of the reinforcing member 50.

Figure 4:
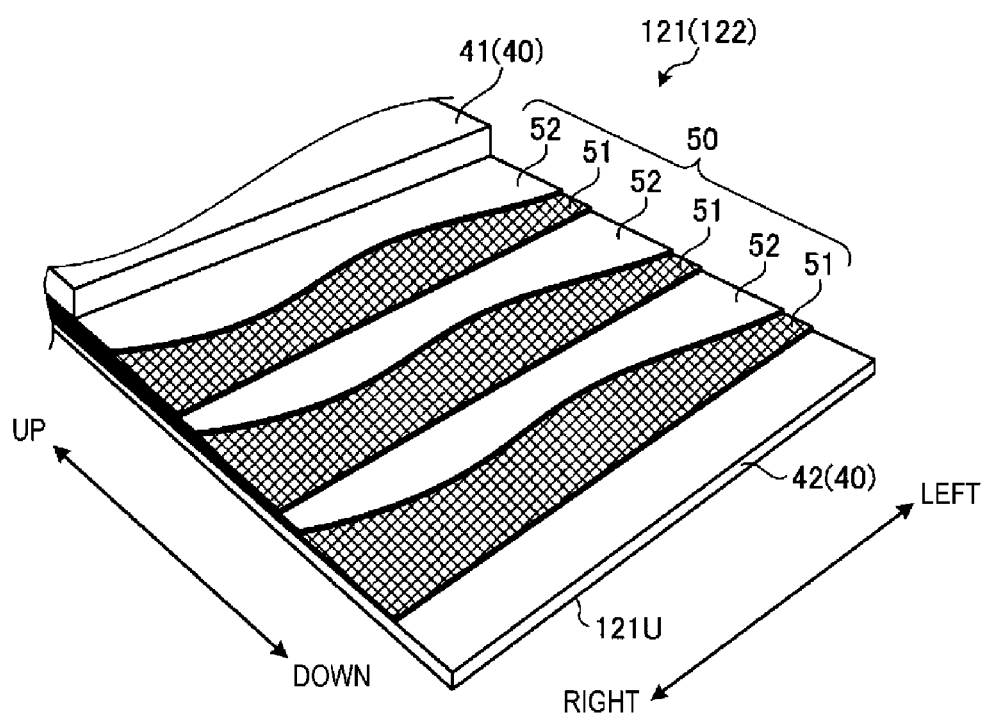
FIG. 4 is a perspective view in which a part of the flexible plate according to the present embodiment is cut away.
Figure 5:
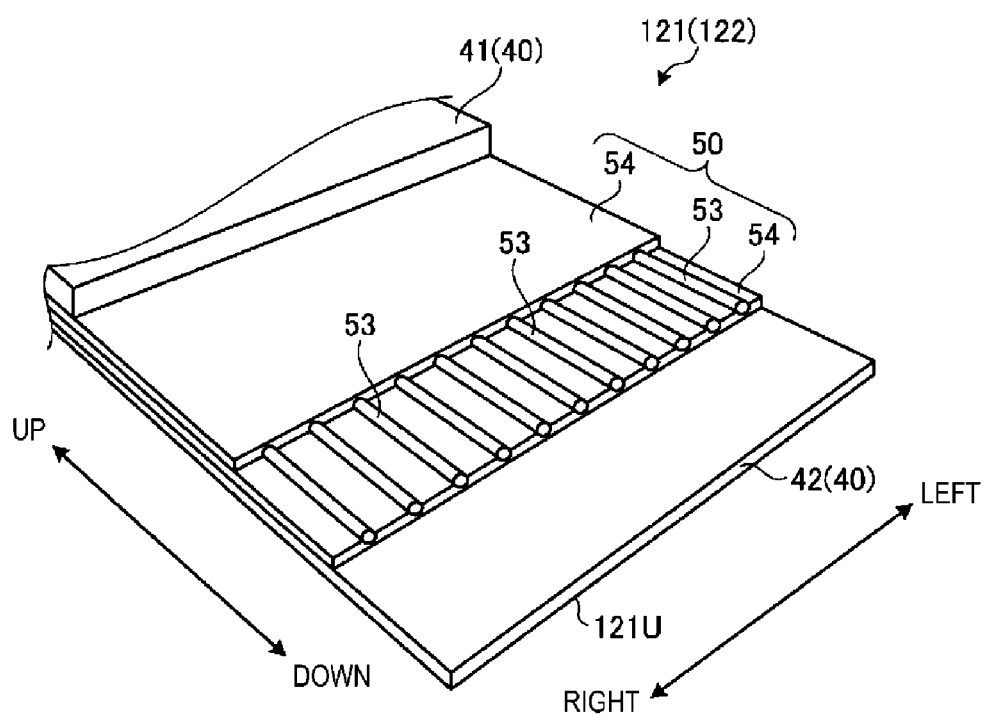
FIG. 5 is a perspective view in which a part of the flexible plate according to the present embodiment is cut away.
Figure 6:
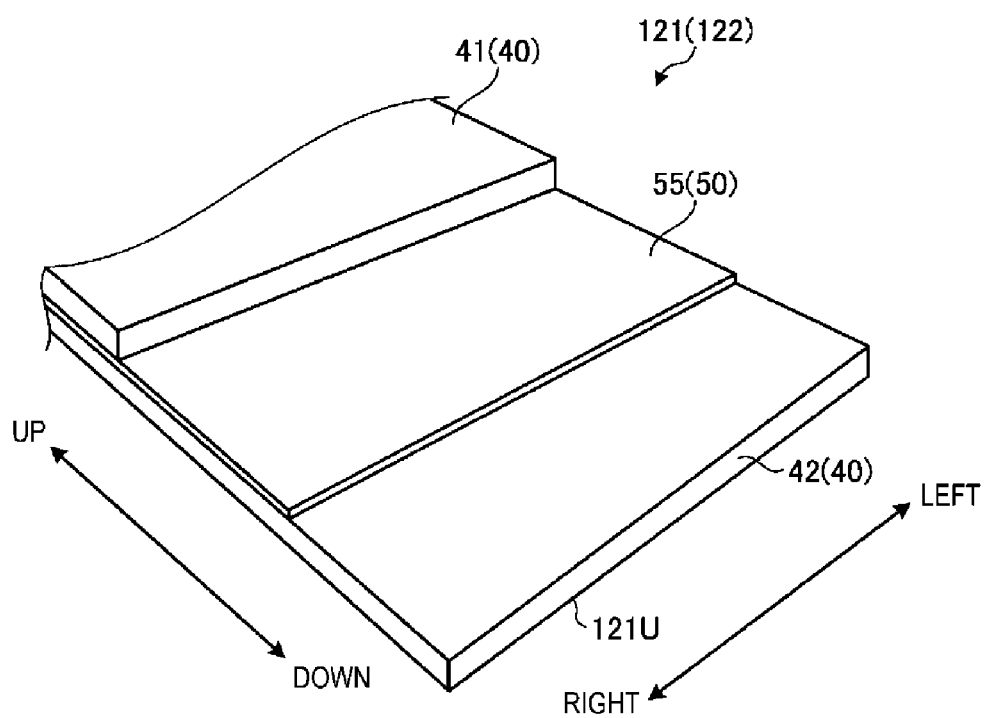
FIG. 6 is a perspective view in which a part of the flexible plate according to the present embodiment is cut away.

FIGS. 4, 5, and 6 each illustrates an example of a first flexible plate 121 according to the present embodiment. FIGS. 4, 5, and 6 each illustrates a perspective view with part of the first flexible plate 121 cut away.

FIG. 4 illustrates an example where the reinforcing member 50 is canvas 51. Examples of canvas 51 include at least one of a nylon canvas, a polyester canvas, a vinylon canvas, a rayon canvas, an acrylic canvas, a polyurethane canvas, an aramid canvas, or a cotton canvas. In the present embodiment, the reinforcing member 50 has a multilayer structure of a canvas 51 and a core rubber plate 52.

FIG. 5 illustrates an example in which the reinforcing member 50 includes metal wire 53 and a core rubber plate 54. Examples of the metal wire 53 include iron wire. The metal wire 53 extends in the vertical direction. Each of a plurality of metal wires 53 is disposed at an interval in the horizontal direction.

FIG. 6 illustrates an example where the reinforcing member 50 includes a metal plate 55. Examples of the metal plate 55 include an iron plate.

An example of a first flexible plate 121 is described with reference to FIGS. 4 to 6. Similar to first flexible plate 121, the second flexible plate 122 may have the structure described with reference to FIGS. 4 to 6. Moreover, the first flexible plate 121 and the second flexible plate 122 may have the same structure or a different structure. For example, as illustrated in FIG. 4, first flexible plate 121 may include canvas 51, and as illustrated in FIG. 5, the second flexible plate 122 may include metal wire 53, and as illustrated in FIG. 6, the first flexible plate 121 and the second flexible plate 122 may each include a metal plate 55.

Note that the flexible plate 120 may include a viscoelastic plate instead of or in addition to the rubber plate 40. Examples of the viscoelastic plate include at least one of a urethane plate, a resin plate, a silicone plate, or a plastic plate. For example, the flexible plate 120 may be a composite of a urethane plate and the reinforcing member 50.

Operation

Figure 7A:
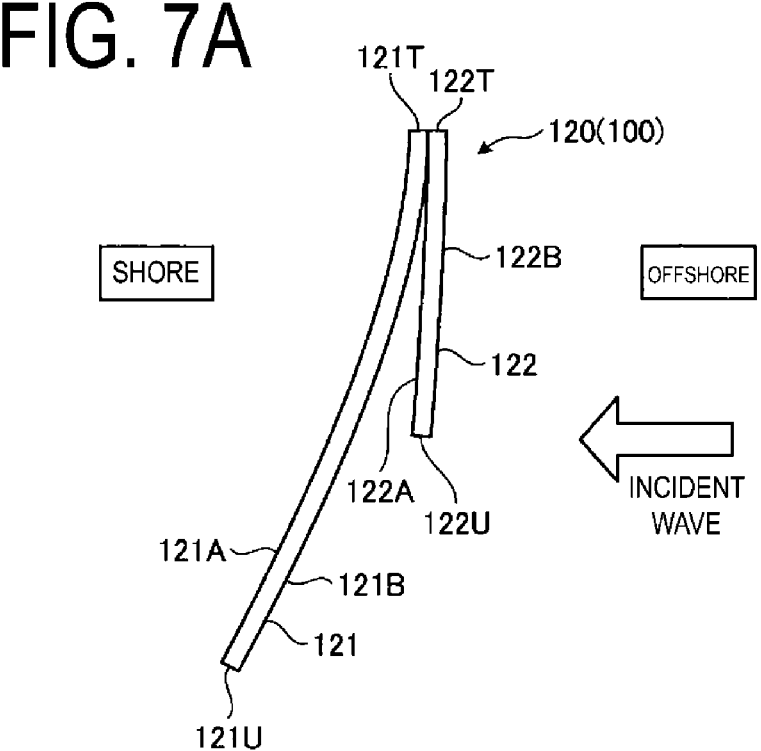
FIGS. 7A and 7B are diagrams schematically illustrating the operation of the flexible plate according to the present embodiment.
Figure 7B:
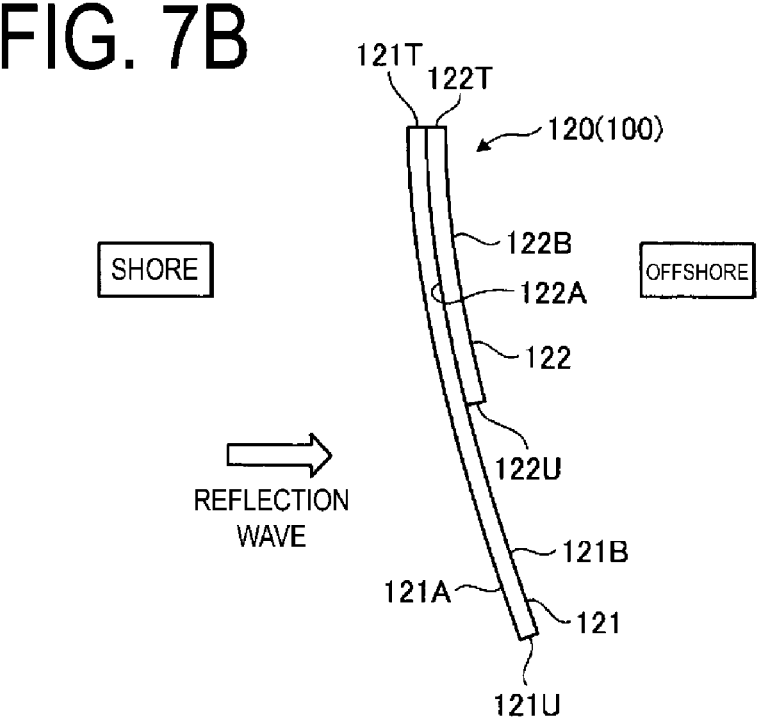
Figure 8A:
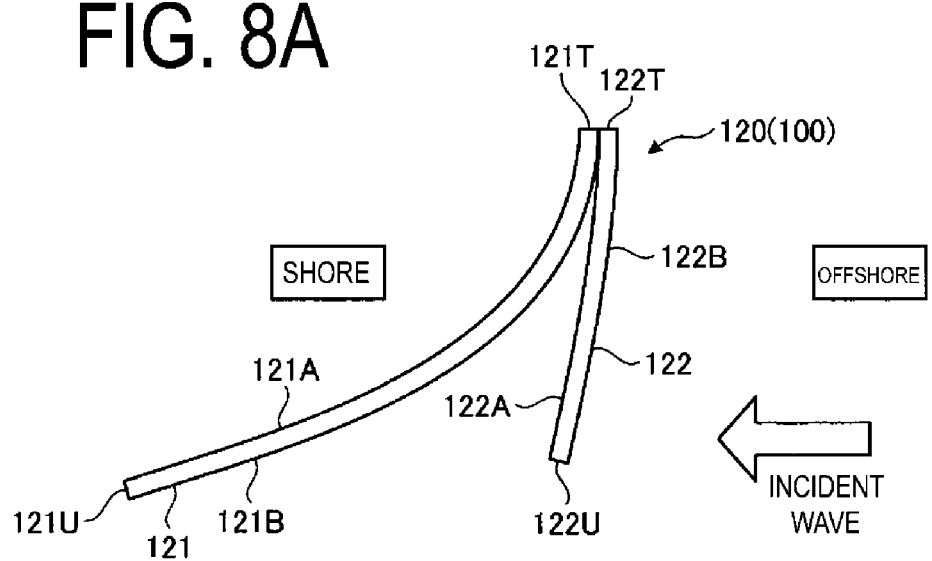
FIGS. 8A and 8B are diagrams schematically illustrating the operation of the flexible plate according to the present embodiment.
Figure 8B:
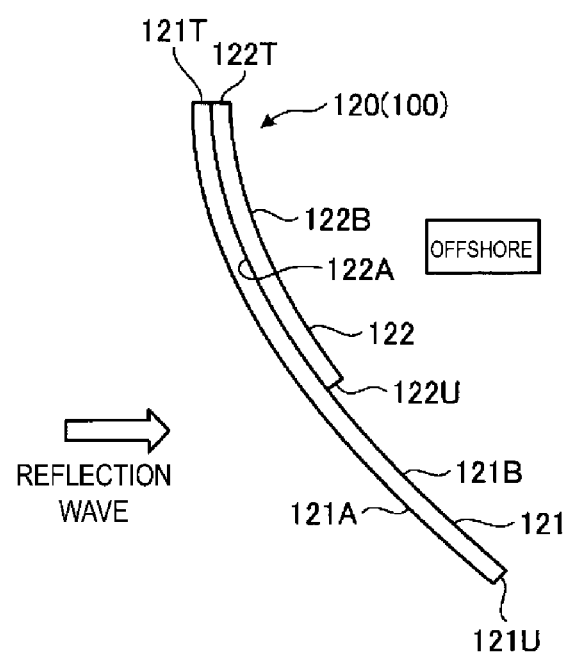

FIGS. 7A to 8B are diagrams schematically illustrating the operation of the flexible plate 120 according to the present embodiment. FIG. 7A is a diagram schematically illustrating an operation of the flexible plate 120 when an incident wave having a first wave height acts on the wave receiving plate 100, and FIG. 7B is a diagram schematically illustrating an operation of the flexible plate 120 when a reflected wave based on the incident wave having the first wave height acts on the wave receiving plate 100. FIG. 8A is a diagram schematically illustrating an operation of the flexible plate 120 when an incident wave having a second wave height higher than the first wave height acts on the wave receiving plate 100, and FIG. 8B is a diagram schematically illustrating the operation of the flexible plate 120 when a reflected wave based on the incident wave having the second wave height acts on the wave receiving plate 100.

In the following description, displacement of the wave receiving plate 100 such that the lower end portion of the wave receiving plate 100 moves toward the shore side is appropriately referred to as swinging toward the shore side, and the displacement of the wave receiving plate 100 such that the lower end portion of the wave receiving plate 100 moves toward the offshore side is appropriately referred to as swinging toward the offshore side. Moreover, deflection of the flexible plate 120 such that the lower end portion of the flexible plate 120 moves toward the shore is appropriately referred to as deflection toward the shore, and deflection of the flexible plate 120 such that the lower end portion of the flexible plate 120 moves toward the offshore side is appropriately referred to as deflection toward the offshore side.

In addition, when the position of the lower end portion of the flexible plate 120 in the reference state where the wave energy does not act on the flexible plate 120 is used as a reference point, the amount of movement when the lower end portion of the flexible plate 120 moves from the reference point due to the action of the wave energy is appropriately referred to as the amount of deflection of the flexible plate 120.

In a case where an incident wave having a first wave height is incident on the wave receiving plate 100, the wave energy of the incident wave acts on each of the rear surface of the rigid plate 110 and the rear surface of the flexible plate 120. As a result, the wave receiving plate 100 swings toward the shore side. In flexible plate 120, the incident wave is incident on each of the lower region of the rear surface 121B of the first flexible plate 121 and the entire region of rear surface 122B of the second flexible plate 122. Each of the first flexible plate 121 and the second flexible plate 122 deflects toward the shore side. The first wave height is low and the wave energy is small, and thus the amount of deflection of the first flexible plate 121 and the amount of deflection of the second flexible plate 122 are small.

Note that the dimension of the first flexible plate 121 in the vertical direction is longer than that of the second flexible plate 122, and the rigidity of the first flexible plate 121 is lower than the rigidity of the second flexible plate 122, and thus, as illustrated in FIG. 7A, when the incident wave acts on the wave receiving plate 100, the amount of deflection of the first flexible plate 121 is larger than the amount of deflection of the second flexible plate 122. Although the second flexible plate 122 slightly deflects toward the shore, the amount of deflection of the second flexible plate 122 is sufficiently smaller than the amount of deflection of the first flexible plate 121. Moreover, the first flexible plate 121 and the second flexible plate 122 are slightly separated.

In a case where the incident wave having a first wave height reaches the shore C and the reflected wave reflected by the shore C is incident on the wave receiving plate 100, the wave energy of the reflected wave acts on each of the front surface of the rigid plate 110 and the front surface of the flexible plate 120. As a result, the wave receiving plate 100 swings toward the offshore side. In flexible plate 120, the reflection wave are incident on all regions of front surface 121A of first flexible plate 121 and are not directly incident on second flexible plate 122. Although each of the first flexible plate 121 and the second flexible plate 122 deflect toward the offshore side, the first wave height is low, and thus the amount of deflection of the first flexible plate 121 and the amount of deflection of the second flexible plate 122 are small. In addition, the first flexible plate 121 and the second flexible plate 122 do not separate from each other and deflect in a contact state.

Even in a case where an incident wave having a second wave height is incident on the wave receiving plate 100, each of the first flexible plate 121 and the second flexible plate 122 deflects toward the shore side. The second wave height is high and the wave energy is large, and thus the amount of deflection of the first flexible plate 121 and the amount of deflection of the second flexible plate 122 are respectively greater than in the case where an incident wave having a first wave height acts. In particular, as illustrated in FIG. 8A, the first flexible plate 121 greatly deflects. The rigidity of the second flexible plate 122 is high, and thus the amount of deflection of the second flexible plate 122 is sufficiently smaller than the amount of deflection of the first flexible plate 121. Moreover, the first flexible plate 121 and the second flexible plate 122 are greatly separated.

In a case where the incident wave having a second wave height reaches the shore and the reflection wave reflected by the shore is incident on the wave receiving plate 100, each of the first flexible plate 121 and the second flexible plate 122 deflects toward the offshore side. The second wave height is high and the wave energy is high, and thus the amount of deflection of the first flexible plate 121 and the amount of deflection of the second flexible plate 122 are greater than in a case where a reflection wave based on an incident wave having a first height acts. In addition, the first flexible plate 121 and the second flexible plate 122 do not separate from each other and deflect in a contact state.

As described above, in the present embodiment, in a case where the wave height is small (in the case of the first wave height), the amount of deflection of the flexible plate 120 is small and behaves like a rigid plate. Accordingly, even when the acting wave energy is small, the wave receiving plate 100 swings significantly. This effectively converts the wave energy into mechanical energy.

On the other hand, in a case where the wave height is large (in the case of the second wave height), the flexible plate 120 deflects passively without any use of a mechanical device, and the area (projected area) of the wave receiving plate 100 with respect to the wave front is automatically reduced. As a result, some of the wave energy acting on the wave receiving plate 100 is allowed to escape, and excessive wave energy is suppressed from acting on the wave receiving plate 100.

Effects

As described above, according to the present embodiment, at least a part of the wave receiving plate 100 is the flexible plate 120, and thus, when excessive wave energy is applied to the wave receiving plate 100, the flexible plate 120 deflects. Deflection of the flexible plate 120 reduces the area (projected area) of the wave receiving plate 100 with respect to the wave front, and thus it is possible to suppress excessive wave energy from acting on the wave receiving plate 100. Accordingly, failure or breakage of the wave receiving plate 100 or the power generation device 4 is suppressed. No mechanical device is used and the area of the wave receiving plate 100 may be passively changed, and thus the durability of the wave receiving plate 100 may be improved at low cost, and a reduction in performance of the wave receiving plate 100 and the wave power generation system 1 may be suppressed.

In addition, in the present embodiment, the flexible plate 120 includes a first flexible plate 121 and a second flexible plate 122 adjacent to the first flexible plate 121. The wave energy of the incident wave and the wave energy of the reflection wave are different from each other, and thus differences in the dimensions and rigidity of the first flexible plate 121 and the dimensions and rigidity of the second flexible plate 122 are provided, and by making the amount of deflection of the first flexible plate 121 and the amount of deflection of the second flexible plate 122 asymmetrical, the flexible plate 120 may deflect at an appropriate deflection amount in accordance with the wave energy that acts.

Moreover, in the present embodiment, the lower end portion of the wave receiving plate 100 facing the ocean floor F is constituted by a flexible plate 120. The topography of the ocean floor F may vary due to flooding or typhoon. As the topography of the ocean floor F changes, the lower end portion of the wave receiving plate 100 may come into contact with the ocean floor F. Contact between the wave receiving plate 100 and the ocean floor F may cause the wave receiving plate 100 or the power generation device 4 to fail or break. According to the present embodiment, even in a case where the flexible plate 120 and the ocean floor F come in contact, deflection of the flexible plate 120 suppresses failure or breakage of the wave receiving plate 100 or the power generation device 4.

Furthermore, the durability of the wave receiving plate 100 may be improved by using the rubber plate 40 in the flexible plate 120. The rubber plate 40 has high corrosion resistance to salt and is lightweight, and thus it is possible to reduce the manufacturing cost and maintenance administrative cost of the wave receiving plate 100.

By configuring the flexible plate 120 as a composite member of the rubber plate 40 and the reinforcing member 50, the amount of deflection of the flexible plate 120 that swings with the wave energy may be optionally adjusted by selecting an optimal material for the material of the reinforcing member 50 and by increasing or decreasing the number of core rubber plates 52. This suppresses excessive wave energy from acting on the wave receiving plate 100.

In the related art, the wave energy changes significantly depending on the natural conditions, and thus, the wave receiving plate had to be designed in either method of method 1 or 2, that is (method 1) the area of the wave receiving plate is increased in accordance with calm conditions in which waves are small, or (method 2) the wave receiving plate is made smaller in accordance with conditions where waves are surging in which waves are large. However, in (method 1), when a high wave occurs as in a typhoon, the wave energy becomes excessive and causes a failure or breakage of the power generation device. In (method 2), the wave receiving plate hardly swings when waves are calm, and thus there is a problem that the amount of power generation is small, and the energy conversion efficiency and the facility utilization rate are extremely deteriorated.

According to the present technology, a wave receiving plate 100 having a large area may be employed, and by automatically (passively) reducing the area of the wave receiving plate without using any mechanical device during high waves, the problem of the related art may be solved. That is, it is possible to design and manufacture a wave power generation device that has high energy conversion efficiency and facility utilization rate, and does not fail or break even in high waves, or in other words, a power generation device with high survivability. In particular, in Japan, typhoons strike and occasionally generate very large high waves, and thus the present technology may contribute to the practical use of efficient and highly survivable wave power generation.

Other Embodiments

Note that in the embodiment described above, the flexible plate 120 (the first flexible plate 121 and the second flexible plate 122) includes a front surface rubber plate 41 and a rear surface rubber plate 42. At least one of the front surface rubber plate 41 or the rear surface rubber plate 42 may be omitted. Additionally, the reinforcing member 50 may be omitted. In other words, the flexible plate 120 may have a single layer structure.

Note that in the embodiment described above, the flexible plate 120 includes a first flexible plate 121 and a second flexible plate 122 adjacent to the first flexible plate 121. The flexible plate 120 supported by the support device 10 may be one or optional numbers of three or more flexible plates 120.

Note that in the embodiment described above, a part including the lower end portion of the wave receiving plate 100 is a flexible plate 120. A part including the left end portion of the wave receiving plate 100 may be a flexible plate, a part including the right end portion of the wave receiving plate 100 may be a flexible plate, or a part including the upper end portion of the wave receiving plate 100 may be a flexible plate. A part including the end portion of the wave receiving plate 100 is a flexible plate, and by the end portion of that flexible plate being a free end, and thus when the wave receiving plate 100 is disposed in the ocean, at least a part of the wave receiving plate 100 may deflect due to the action of the wave energy. Accordingly, the area (projected area) of the wave receiving plate 100 with respect to the wave front is reduced, and thus, excessive wave energy acting on the wave receiving plate 100 and the power generation device is suppressed.

Note that in the embodiment described above, the wave receiving plate 100 includes a rigid plate 110 connected to the support device 10, and a flexible plate 120 supported by the rigid plate 110. The entire wave receiving plate 100 may be configured by a flexible plate 120.

The invention claimed is:

1. A wave receiving plate assembly configured to form part of a wave power generation system, said wave receiving plate assembly configured to be pivotably supported by a support device in the wave power generation system, the wave receiving plate assembly comprising a first flexible plate having a first rigidity, and a second flexible plate disposed adjacent to the first flexible plate and having a second rigidity greater than the first rigidity;
    wherein a lower end portion of the second flexible plate is disposed above a lower end portion of the first flexible plate.

2. The wave receiving plate assembly according to claim 1, wherein a lower end portion of the first flexible plate is a free end.

3. The wave receiving plate assembly according to claim 1, wherein the second flexible plate is disposed further on an incident wave side than the first flexible plate.

4. The wave receiving plate assembly according to claim 1, further comprising a rigid plate configured to be connected to the support device, wherein the first flexible plate is supported by a lower portion of the rigid plate.

5. The wave receiving plate assembly according to claim 1, wherein the first flexible plate comprises a rubber plate.

6. The wave receiving plate assembly according to claim 1, wherein the first flexible plate comprises a viscoelastic plate.

7. The wave receiving plate assembly according to claim 1, wherein the first flexible plate is a composite material of a rubber plate and a reinforcing member.

8. The wave receiving plate assembly according to claim 1, wherein the first flexible plate is a composite material of a viscoelastic plate and a reinforcing member.

9. The wave receiving plate assembly according to claim 6, wherein the viscoelastic plate comprises at least one of a urethane plate, a resin plate, a silicone plate, or a plastic plate.

10. The wave receiving plate assembly according to claim 7, wherein the reinforcing member comprises at least one of synthetic fiber, semi-synthetic fiber, regenerated fiber, plant fiber, carbon fiber, animal fiber, metal fiber, metal wire, or metal plate.

11. The wave receiving plate assembly according to claim 10, wherein the synthetic fiber comprises at least one of nylon, polyester, acrylic, polyvinyl chloride, polyurethane, vinylon, or aramid; the semi-synthetic fiber comprises at least one of acetate, triacetate, or promix; the regenerated fiber comprises at least one of rayon, cupro, or polynosic; the plant fiber comprises at least one of cotton or hemp; the carbon fiber comprises at least one of acrylic or pitch; the animal fiber comprises at least one of hair, angora, spider silk, or mohair; and the metal fiber comprises at least one of silver thread or steel thread.

12. A wave power generation system comprising: a wave receiving plate assembly according to claim 1, further comprising a support device pivotably supporting the wave receiving plate assembly; and a power generation device that is operatively connected to the support device and configured to generate power based on a kinetic energy of the wave receiving plate assembly swinging by wave energy.

13. A wave power generation system comprising:
a support frame comprising a plurality of pillars configured to be fixed to an ocean floor, and a connecting plate supported by the pillars, the connecting plate configured to be disposed above an ocean surface in an installed configuration of the support frame,
a wave receiving plate assembly pivotably supported by the support frame, the wave receiving plate assembly comprising a first flexible plate having a first rigidity, and a second flexible plate disposed adjacent to the first flexible plate and having a second rigidity greater than the first rigidity, wherein a lower end portion of the second flexible plate is disposed above a lower end portion of the first flexible plate, and
a power generation device operatively connected to the support frame, the power generation device configured to generate power based on a kinetic energy of the wave receiving plate assembly swinging by wave energy.

14. The wave power generation system according to claim 13, further comprising a rigid plate connected to the support frame, wherein the first flexible plate is supported by a lower portion of the rigid plate.

15. The wave power generation system according to claim 13, wherein the first flexible plate comprises a rubber plate.

16. The wave power generation system according to claim 13, wherein the first flexible plate comprises a viscoelastic plate.

17. The wave power generation system according to claim 13, wherein the first flexible plate is a composite material of a rubber plate and a reinforcing member.

* * * * *